United States Patent
Baer

(10) Patent No.: US 10,572,691 B2
(45) Date of Patent: Feb. 25, 2020

(54) OPERATING SYSTEM PRIVACY MODE

(71) Applicant: Microsoft Technology Licensing, LLC, Redmond, WA (US)

(72) Inventor: Matthias Baer, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 148 days.

(21) Appl. No.: 15/567,559

(22) PCT Filed: Apr. 28, 2015

(86) PCT No.: PCT/US2015/028037
§ 371 (c)(1),
(2) Date: Oct. 18, 2017

(87) PCT Pub. No.: WO2016/175764
PCT Pub. Date: Nov. 3, 2016

(65) Prior Publication Data
US 2018/0150653 A1 May 31, 2018

(51) Int. Cl.
*G06F 21/74* (2013.01)
*G06F 21/62* (2013.01)
*H04L 29/08* (2006.01)

(52) U.S. Cl.
CPC .......... *G06F 21/74* (2013.01); *G06F 21/6263* (2013.01); *H04L 67/22* (2013.01)

(58) Field of Classification Search
CPC .... G06F 21/74; G06F 21/6263; G06F 21/606; H04L 67/22
See application file for complete search history.

(56) References Cited

U.S. PATENT DOCUMENTS

| | | | |
|---|---|---|---|
| 5,023,773 A | 6/1991 | Baum et al. | |
| 8,266,708 B2 | 9/2012 | Shevchenko et al. | |
| 8,452,797 B1* | 5/2013 | Paleja | G06Q 30/02 707/767 |
| 8,825,758 B2 | 9/2014 | Bailor et al. | |
| 2002/0174073 A1* | 11/2002 | Nordman | G06Q 20/382 705/64 |
| 2004/0153672 A1* | 8/2004 | Watt | G06F 9/3012 726/22 |

(Continued)

FOREIGN PATENT DOCUMENTS

| | | |
|---|---|---|
| WO | WO-2002048844 | 6/2002 |
| WO | WO-2010147610 | 12/2010 |

(Continued)

OTHER PUBLICATIONS

"How to use Private Mode on the Samsung Galaxy S5", Retrieved From: <https://www.youtube.com/watch?v=_yMGGokR3mY> Feb. 9, 2015, Apr. 11, 2014, 2 pages.

(Continued)

*Primary Examiner* — Sher A Khan

(57) ABSTRACT

Operating system privacy mode techniques are described. In one or more implementations, techniques are described to control usage tracking of a computing device. An input is received by an operating system of the computing device to switch to a privacy mode. Responsive to the input, usage tracking is ceased by the operating system of user interaction with the computing device.

20 Claims, 8 Drawing Sheets

(56) References Cited

U.S. PATENT DOCUMENTS

| | | | |
|---|---|---|---|
| 2004/0162992 A1* | 8/2004 | Sami | H04L 29/12009 726/13 |
| 2005/0267981 A1* | 12/2005 | Brumley | H04L 67/02 709/232 |
| 2006/0075019 A1* | 4/2006 | Donovan | G06Q 30/02 709/203 |
| 2006/0095558 A1* | 5/2006 | Christian | H04L 29/12009 709/224 |
| 2007/0143860 A1* | 6/2007 | Hardt | G06F 21/6254 726/28 |
| 2009/0013377 A1 | 1/2009 | Rouhana, Jr. | |
| 2010/0024020 A1* | 1/2010 | Baugher | G06F 21/6245 726/7 |
| 2010/0024028 A1* | 1/2010 | Baugher | G06F 21/62 726/17 |
| 2010/0229112 A1* | 9/2010 | Ergan | G06F 3/04895 715/764 |
| 2011/0283363 A1 | 11/2011 | Verschoor et al. | |
| 2012/0064920 A1 | 3/2012 | Shaw | |
| 2012/0084349 A1* | 4/2012 | Lee | G06Q 30/02 709/203 |
| 2012/0149325 A1* | 6/2012 | Titus | H04W 4/90 455/404.2 |
| 2012/0246641 A1 | 9/2012 | Gehrmann | |
| 2012/0272338 A1* | 10/2012 | Falkenburg | G06F 21/552 726/30 |
| 2012/0278830 A1* | 11/2012 | Khoshgozaran | G06Q 30/02 725/25 |
| 2012/0304286 A1* | 11/2012 | Croll | G06F 21/6263 726/22 |
| 2013/0067588 A1* | 3/2013 | Roy | G06F 21/6263 726/26 |
| 2013/0080498 A1* | 3/2013 | Desilva | H04L 67/22 709/201 |
| 2014/0123325 A1* | 5/2014 | Jung | G06F 21/6254 726/30 |
| 2014/0157422 A1 | 6/2014 | Livshits et al. | |
| 2014/0283141 A1 | 9/2014 | Shepherd et al. | |
| 2014/0298051 A1* | 10/2014 | Wyatt | G06F 13/102 713/320 |
| 2015/0130774 A1* | 5/2015 | Kruger | H04M 1/72577 345/184 |
| 2015/0193809 A1* | 7/2015 | Bugenhagen | G06Q 30/0241 705/14.4 |

FOREIGN PATENT DOCUMENTS

| | | |
|---|---|---|
| WO | WO-2012161966 | 11/2012 |
| WO | WO-2014047526 | 3/2014 |

OTHER PUBLICATIONS

"International Preliminary Report on Patentability", Application No. PCT/US2015/028037, dated Jul. 6, 2017, 6 pages.

"International Search Report and Written Opinion", Application No. PCT/US2015/028037, dated Aug. 21, 2015, 10 Pages.

"Second Written Opinion", Application No. PCT/US2015/028037, dated Apr. 4, 2017, 5 pages.

Cohen,"How to Enable Private Browsing in Safari on OS X Yosemite", Retrieved From: <http://www.imore.com/how-use-private-browsing-safari-os-x-yosemite> Jan. 23, 2015, Oct. 16, 2014, 7 pages.

Enck,"TaintDroid: An Information-Flow Tracking System for Realtime Privacy Monitoring on Smartphones", ACM Transactions on Computer Systems (TOCS), Association for Computing Machinery, Inc, US, vol. 32, No. 2,, Jun. 1, 2014, 29 Pages.

Hornyack,""These Aren't the Droids You're Looking for": Retrofitting Android to Protect Data from Imperious Applications", Computer and Communications Security, ACM, 2 Penn Plaza, Suite 701 New York NY 10121-0701, USA, Oct. 17, 2011, 13 Pages.

Onarlioglu,"PRIVEXEC: Private Execution as an Operating System Service", In Proceedings of IEEE Symposium on Security and Privacy, May 19, 2013, 16 pages.

Wenzel,"Add-Ons: Open in Private Browsing Mode", Retrieved From: <https://addons.mozilla.org/en-US/firefox/addon/open-private-browsing/>, Jun. 14, 2013, 2 pages.

* cited by examiner

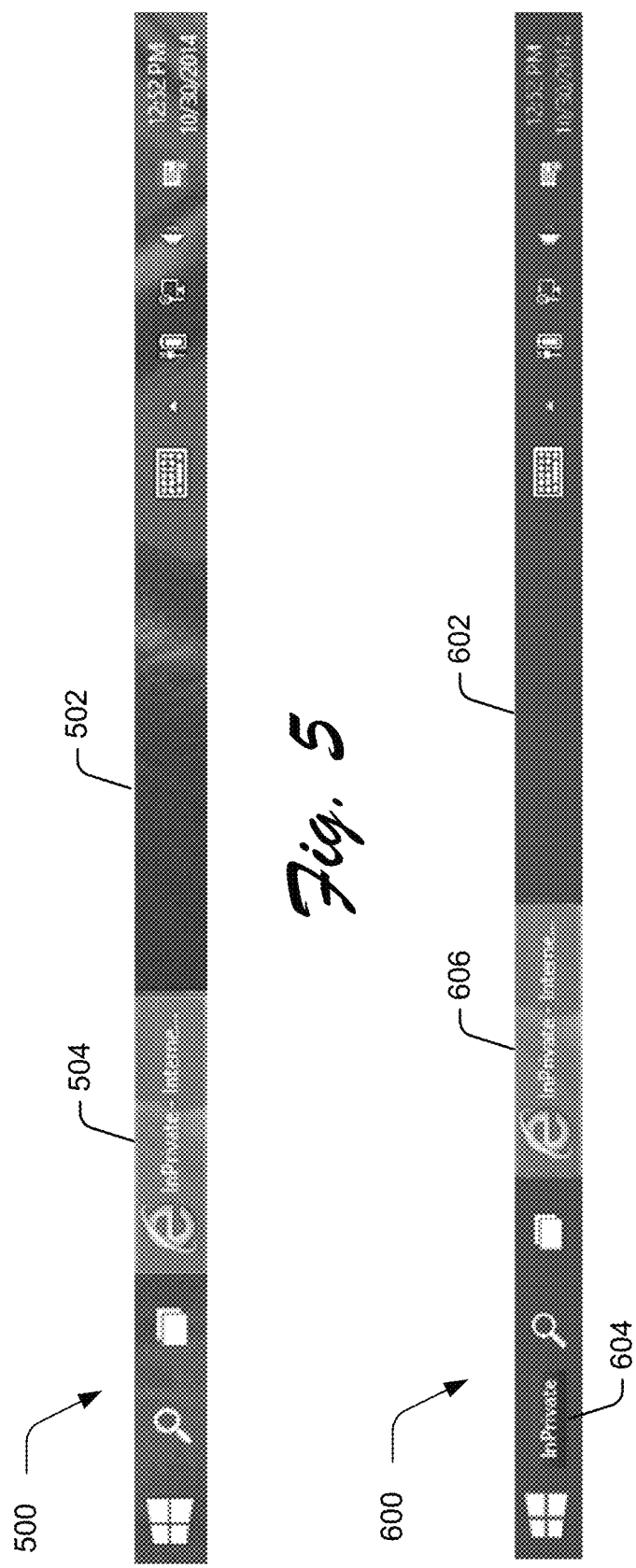

OPERATING SYSTEM PRIVACY MODE

BACKGROUND

The prevalence of usage tracking in computing devices continues to increase. For example, a browser may be configured to store cookies to track user navigation within a website and even between websites, which may be used to supply personalized ads. Other applications have also incorporated usage tracking, such as to "check in" for a social network application, track purchases made, recently accessed documents, maintain a list of geographic locations visited, get directions, and so forth. Thus, usage tracking may be used to support a variety of additional functionality that is made available to a user.

In some instances, however, this usage tracking is not desired. A user shopping for a birthday present, for example, may have information related to the search continue even after the search, e.g., as ads, recently accessed webpages used to make a greeting card, location tracking from physically visiting a store, and so forth. Conventional techniques that are made available to stop this tracking require the user to manually interact with each application performing the tracking individually, manually turn-off a GPS antenna, and so forth. Thus, this could be frustrating to a user even in instances in which the user is aware of the tracking and especially frustrating in instances in which the user is not aware, such as for a specific application.

SUMMARY

Operating system privacy mode techniques are described. In one or more implementations, techniques are described to control usage tracking of a computing device. An input is received by an operating system of the computing device to switch to a privacy mode. Responsive to the input, usage tracking by the operating system of user interaction with the computing device is ceased.

In one or more implementations, a computing device includes a processing system and memory configured to maintain instructions that are executable by the processing system to implement an operating system having a control that is user selectable to cause the operating system to enter a privacy mode to cause applications that are executed by the processing system to cease usage tracking.

In one or more implementations, a computing device includes a processing system and memory configured to maintain instructions that are executable by the processing system to implement an operating system having a control that is user selectable to cause the operating system to enter a privacy mode to cease usage tracking performed by the operating system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 5 depicts an example of a user interface having a toolbar that includes a representation of an application that also includes an indication of support of the privacy mode by the application.

FIG. 6 depicts an example of a user interface as also having a toolbar that includes a includes a control that is user selectable to cause entry into or leave a privacy mode and a representation of an application that also includes an indication of support of the privacy mode by the application.

DETAILED DESCRIPTION

Overview

An ability of a user to stop user tracking performed by a computing device is limited in conventional techniques to interaction with granular settings of individual application, such as to turn off a search history, geographic location functionality of a GPS, recently used documents, and so forth. Thus, these conventional techniques are hard to find and control as these settings and controls are conventionally scattered throughout the system. Additionally, some usage tracking performed by the computing device may not be intuitive to a user and thus difficult for a user to locate and disable, such as synchronization of content "to the cloud" by some applications.

Operating system privacy mode techniques are described. In one or more implementations, the operating system includes a single dedicated control that is user selectable to enter and leave a privacy mode, e.g., as a virtual switch or button. While in the privacy mode, the operating system disables all usage tracking performed by the operating system, such as to track recently used documents, geographic locations at which a computing device the executes the operating system has traveled, and so on. Additionally, the operating system may also disable usage tracking performed by other applications of the computing device, such as browsers, personal digital assistants, social network applications, and so forth. In this way, a user may efficiently and accurately interact with the operating system to control usage tracking, further examples of which are described below and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
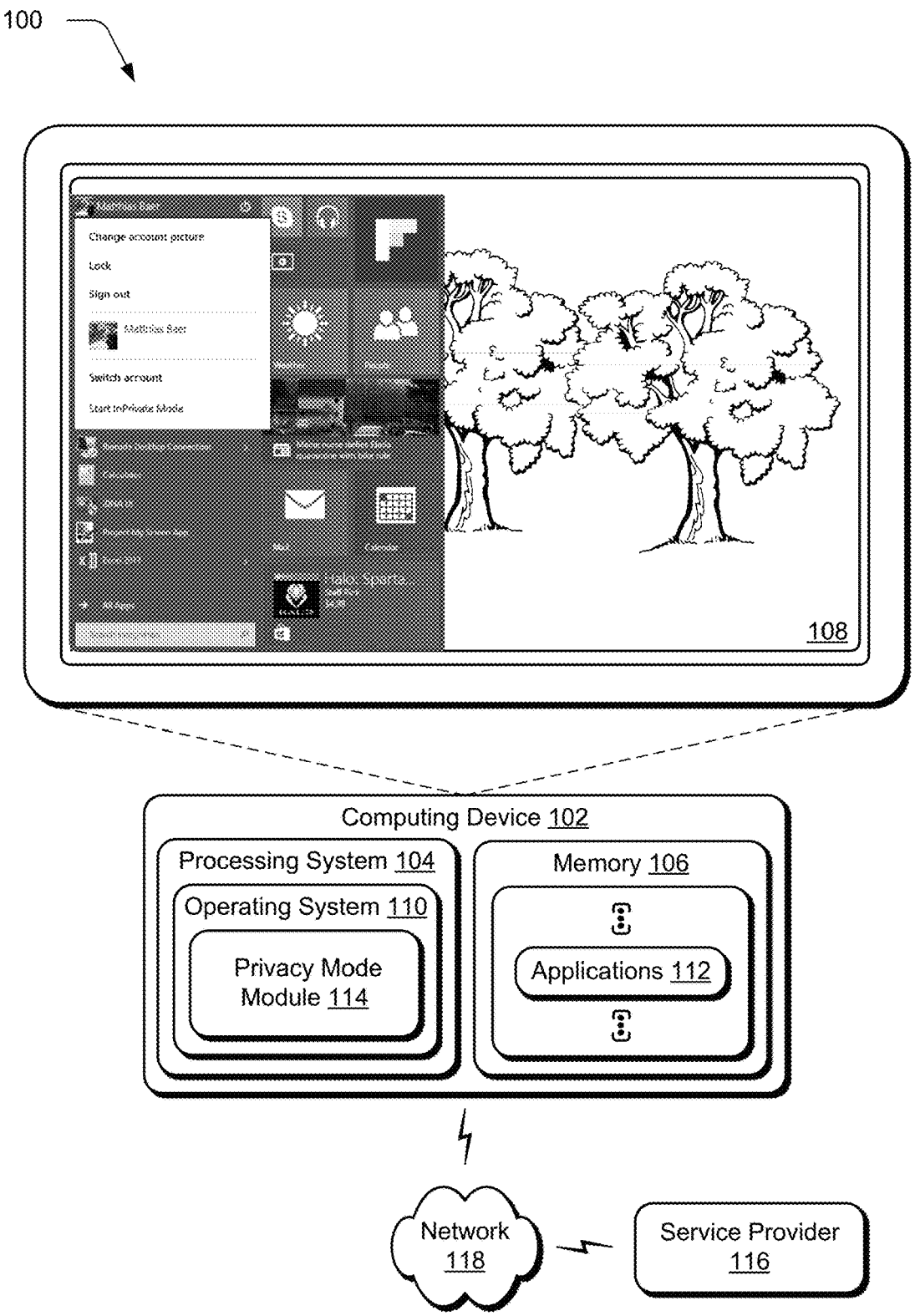
FIG. 1 is an illustration of an environment in an example implementation that is operable to employ operating system privacy mode techniques described herein

FIG. 1 is an illustration of an environment 100 in an example implementation that is operable to employ operating system privacy mode techniques described herein. The illustrated environment 100 includes a computing device 102, which may be configured in a variety of ways.

For example, a computing device may be configured as a computer that is capable of communicating over a network, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on.

The computing device 102 is illustrated as including a variety of hardware components, examples of which include a processing system 104, an example of a computer-readable storage medium illustrated as memory 106, a display device 108, and so on. The processing system 104 is representative of functionality to perform operations through execution of instructions stored in the memory 106. Although illustrated separately, functionality of these components may be further divided, combined (e.g., on an application specific integrated circuit), and so forth.

The computing device 102 is further illustrated as including an operating system 110. The operating system 110 is configured to abstract underlying functionality of the computing device 102 to applications 112 that are executable on the computing device 102. For example, the operating system 110 may abstract processing system 104, memory 106, network, and/or display device 108 functionality of the computing device 102 such that the applications 112 may be written without knowing "how" this underlying functionality is implemented. The application 112, for instance, may provide data to the operating system 110 to be rendered and displayed by the display device 108 without understanding how this rendering will be performed. The operating system 108 may also represent a variety of other functionality, such as to manage a file system and user interface that is navigable by a user of the computing device 102.

The privacy mode module 114 is representative of functionality of the operating system 110 to use of a privacy mode to control usage tracking performed by the computing device 102. As previously described, the operating system 110 and applications 112 that are executed by the computing device 102 may include a variety of functionality to remember, sync, and learn from user interaction with the computing device 102. This has countless benefits like being able to seamlessly move between devices, have backups of critical data (e.g., stored at a service provider 116 via a network 118), get smart reminders, get directions, have lists of frequently or recently used content, continue a task where the user left off, remember preferences, and so on. However, there are times when a user might interact with the computing device 102 in a manner that is sensitive or confidential and so prefer to not to have this usage tracked. Conventional techniques to achieve this privacy involve various disparate piecemeal solutions, e.g., to on privacy mode in their web browser and separately turn off a GPS antenna, clear out a search history, attempt to stop cloud synchronization (if available), and so on.

Accordingly, the privacy mode module 114 supports a single control to enter or leave a privacy mode which is configured to automatically stop tracking user activity from that point until the user selects to exit the mode. The privacy mode module 114 also supports techniques for third-party applications 112 to support this mode, and to inform users whether the mode is supported by an application. Further discussion of these and other examples is included in the following and shown in corresponding figures.

Figure 2:
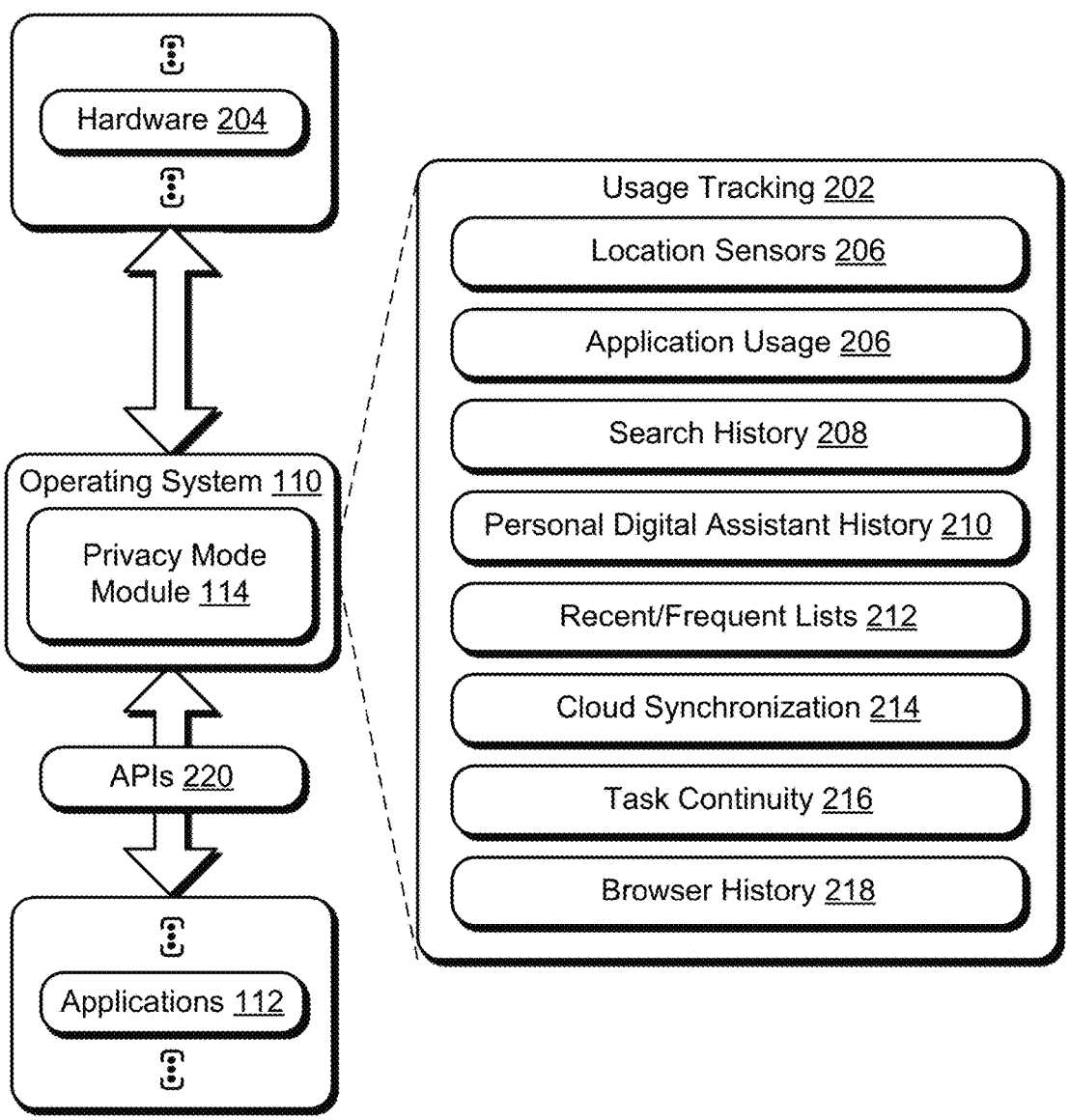
FIG. 2 depicts a system in an example implementation in which examples of usage tracking performed by an operating system, applications, and hardware of a computing device of FIG. 1 is shown in greater detail.

FIG. 2 depicts a system 200 in an example implementation in which examples of usage tracking performed by the operating system 110, applications 112, and hardware of the computing device 102 of FIG. 1 is shown in greater detail. The privacy mode module 114 of the operating system 110 in this example is illustrated as showing a variety of examples of usage tracking 202 that is performable by the operating system 110 itself alone or in combination with applications 112 and hardware 204 (e.g., GPS tracking hardware) of the computing device 102.

Usage tracking 202, for instance, may include geographical position tracking performed using location sensors 206 of the hardware 204 of the computing device 102. Accordingly when entering a privacy mode the privacy module 114 may disable those sensors such that this tracking information is not available to the operating system 110 or other applications 112 of the computing device 102.

In another instance, application usage 206 may be tracked by the operating system 110 and thus may also cease when entering the privacy mode. Examples of tracked application usage 206 may include usage tracking 202 performed by the applications 112 themselves such as a search history 208 (e.g., for a browser) or a personal digital assistant history 210 used to learn behaviors of a user when interacting with the computing device 102. Tracked application usage 206 may also include tracking usage of which applications are being used, such as to form recent/frequently used lists 212 of applications 112 for ease of user selection.

As previously described, some applications 112 and even the operating system 110 itself may support automatic synchronization of data to a service provider 116 over a network 118 as part of cloud synchronization 214. The operating system 110 and applications 112, for instance, may synchronize settings, user preferences, and so on to support a consistent user experience on different computing devices. Accordingly, in this instance the privacy mode module 114 may cease this usage tracking 202 while in this mode.

Other instances of usage tracking 202 are also contemplated such as task continuity (e.g., to "continue where you left off" on a workflow, document, spreadsheet, and so on), browser history 218 as previously described, and so on. The privacy mode module 114 is thus configured to control usage tracking 202 performed by the operating system 110 itself as well as usage tracking of other applications 112 via one or more APIs as further described in relation to FIG. 3 and/or hardware 204 of the computing device 102, which may be used to support a variety of different usage scenarios.

Figure 4:
FIG. 4 depicts an example of a user interface having a start menu that includes a control that is user selectable to cause entry into or leave a privacy mode.

For example, a user may interact with the computing device 102 when shopping for a gift and initiate entry into a privacy mode of the operating system 110 by selecting a single control. As shown in a start menu 400 of FIG. 4, for instance, a user may select a control 402 to start a privacy mode. Once selected, user interface indications are caused to be output by the privacy mode module 114 to indicate that the computing device 102 is in this mode to stop usage tracking. As shown in the example 500 of FIG. 5, a tool bar (e.g., taskbar) is output having a representation 504 of an application selectable to navigate and/or launch the application and an indication of the privacy mode. As shown in the example 600 of FIG. 6, a toolbar is also illustrated having a control 604 that is selectable to enter or leave the privacy mode and also indicate when in this mode along with a representation 606 of the application that also indicates support for this mode. A variety of other examples are also contemplated without departing from the spirit and scope of the techniques described herein.

The user may then search and shop for a gift using a browser, make a card in a word processing application, ask a digital assistant for directions to a flower shop, and so on. Once finished, the user then turns the privacy mode off, and none of those activities are stored and thus do not "show up" anywhere on the computing device 102 or other computing devices associated with a user account of the user, e.g., as part of cloud synchronization. While in the privacy mode, the user may still be given access to favorites, recently used documents, settings, and so on and thus the user is provided with a feature rich experience, but does not have that experience tracked while in the privacy mode and thus differs from use of a generic guest login.

Figure 3:
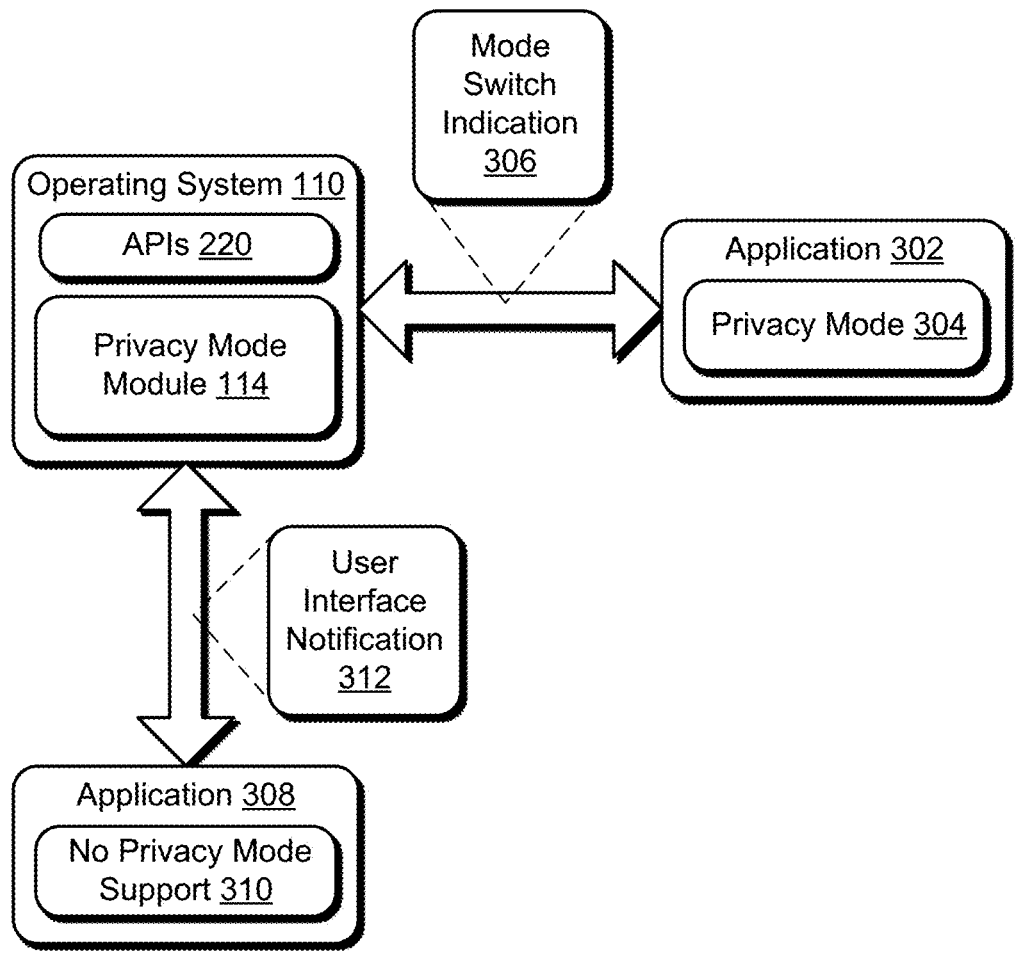
FIG. 3 depicts an example system that exhibits control by a privacy mode module of other applications of a computing device of FIG. 2.

FIG. 3 depicts an example system 300 that exhibits control by the privacy mode module 114 of other applications of the computing device 102. In a first example, the operating system 110 is illustrated as communicating with an application 302 via one or more of the APIs 220. In this example, the application 302 supports a privacy mode 304 and thus a mode switch indication 306 is provided by the privacy mode module 114 via the APIs 220 to perform the switch.

In another instance, however, the operating system 110 communicates with an application 308 that does not have privacy mode support 310. This may be determined by the privacy mode module 114 in a variety of ways, such as through verification with a third-party service, existence of a flag, lack of an authenticated response from the application 308 indicating support, and so on. For example, a level of testing may be performed for third-party applications to verify support for this mode and if so supported, authentication functionality may be included as part of the application 302 to verify this support to the privacy mode module 114.

A variety of different actions may be undertaken by the privacy mode module 114 when an application does not support a privacy mode. A user interface notification 312, for instance, may be output in association with a user interface or representation (e.g., icon) of the application indicating this lack of support for the application as a whole, for particular features and functionality (e.g., menu options) of the application, and so forth.

Figure 7:
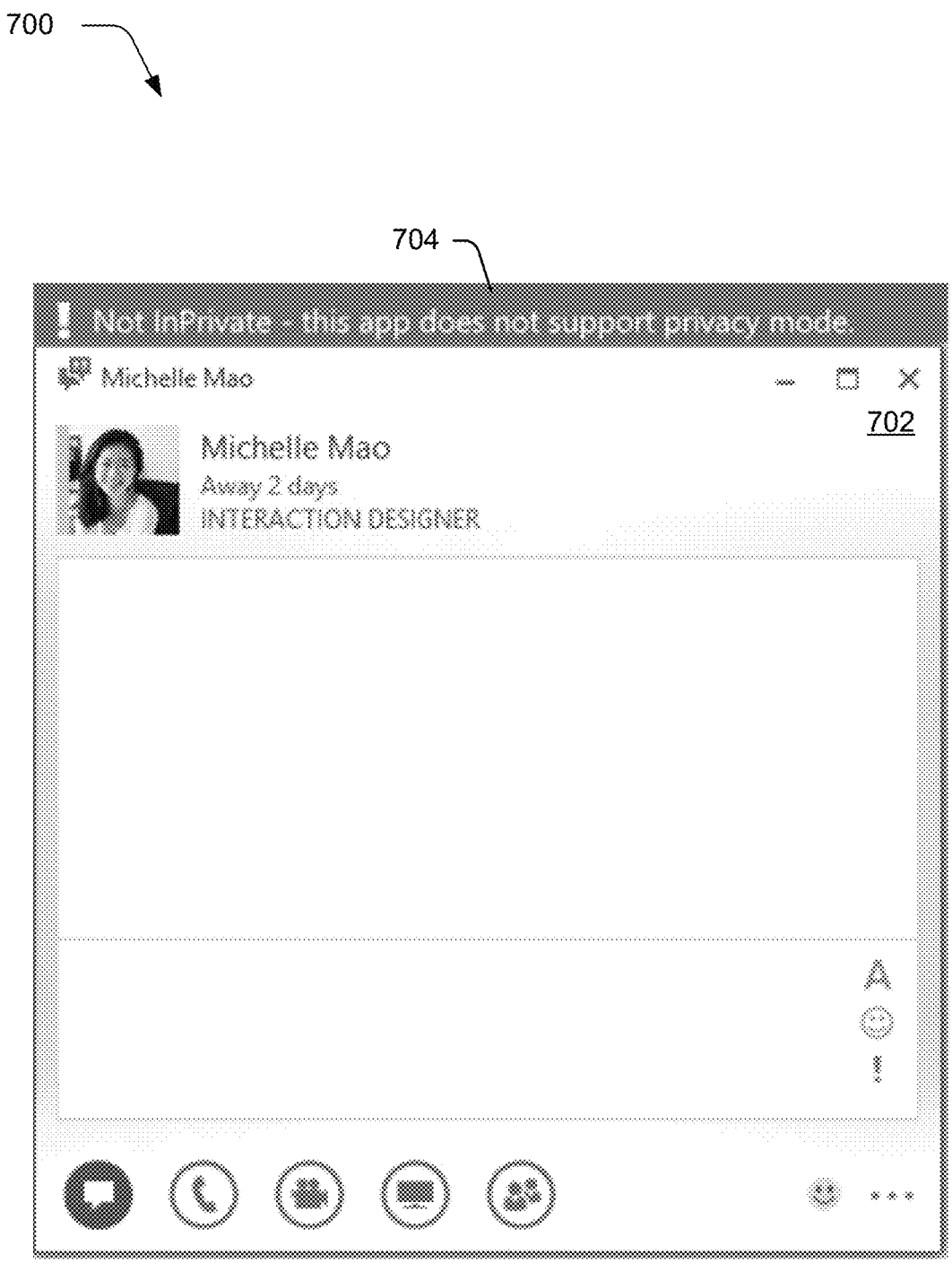
FIG. 7 depicts an example of a window of an application that does not support a privacy mode and that includes an indication of this lack of support.

An example 700 of this is illustrated in FIG. 7 in which a window 702 of an application that does not support a privacy mode includes an indication 704 of this lack of support. For example, a game application may be configured to post scores to a social network and thus the operating system 110 may clearly indicates that the application does not support this mode. In this way, if there is an application that does not have the built-in support (e.g., either because it is an older application or the application cannot work without tracking usage) for privacy mode, then the operating system 110 can determine this and show appropriate user interface indications to notify the user that their activity may be tracked.

In another example, execution of the application 308 may be blocked, e.g., to pause execution while in the privacy mode, prevent launching of the application 308 while in the mode, terminate execution of the application 308, and so forth. Thus, in these examples the user is provided with a simple to implement privacy mode that is usable with a high degree of confidence by the user. Further discussion of this and other examples in contained in the description of the following procedure.

Example Procedure

The following discussion describes operating system privacy mode techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the figures described above.

Functionality, features, and concepts described in relation to the examples of FIGS. 1-7 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Figure 8:
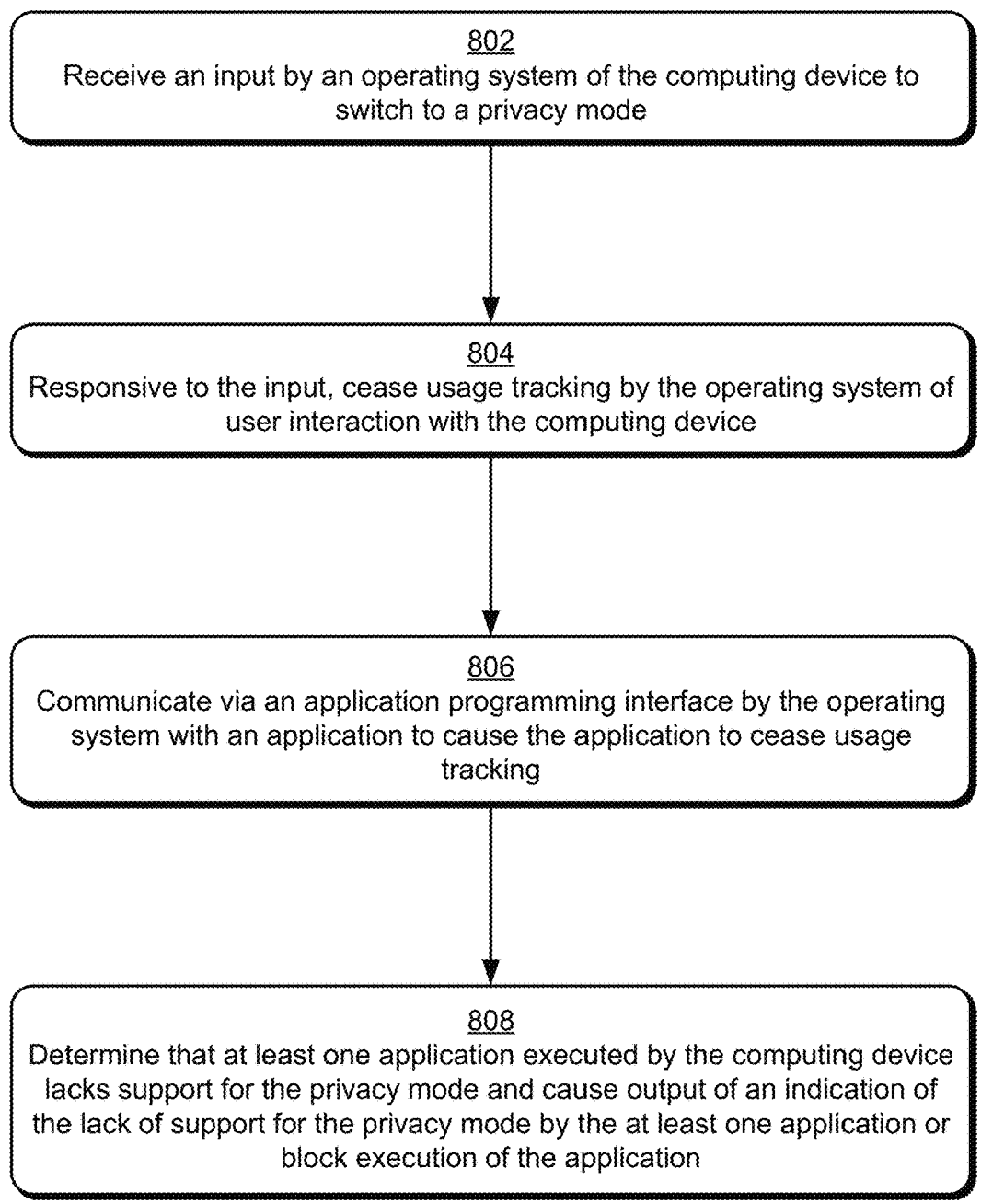
FIG. 8 is a flow diagram depicting a procedure in an example implementation in which techniques are described to control usage tracking of a computing device.

FIG. 8 depicts a procedure 800 in an example implementation in which techniques are described to control usage tracking of a computing device. An input is received by an operating system of the computing device to switch to a privacy mode (block 802). A user, for instance, may select a control 402 in a user interface to initiate the privacy mode. Other inputs are also contemplated, such as gestures, spoken utterances, and so forth.

Responsive to the input, usage tracking by the operating system of user interaction with the computing device is ceased (block 804). In this way, tracking performed by the operating system 110 itself and that is exposed to other applications 112 of the computing device 102 via the operating system 110 is stopped while in the privacy mode.

Communication is performed via an application programming interface by the operating system with an application to cause the application to cease usage tracking (block 806). In this example, the operating system 110 communicates a mode switch indication 306 with an application 302 that supports a privacy mode 304 to initiate the privacy mode 304 functionality of the application 302.

A determination is made that at least one application executed by the computing device lacks support for the privacy mode and output of an indication is caused of the lack of support for the privacy mode by the at least one application or execution of the application is blocked (block 808). The privacy mode module 114, for instance, may determine that application 308 does not have privacy mode support 310 and cause output of a user interface notification 312 as shown in FIG. 7. Other examples are also contemplated, such as to block execution of the application 308 from being launched or from continuing if already launched.

Example System and Device

Figure 9:
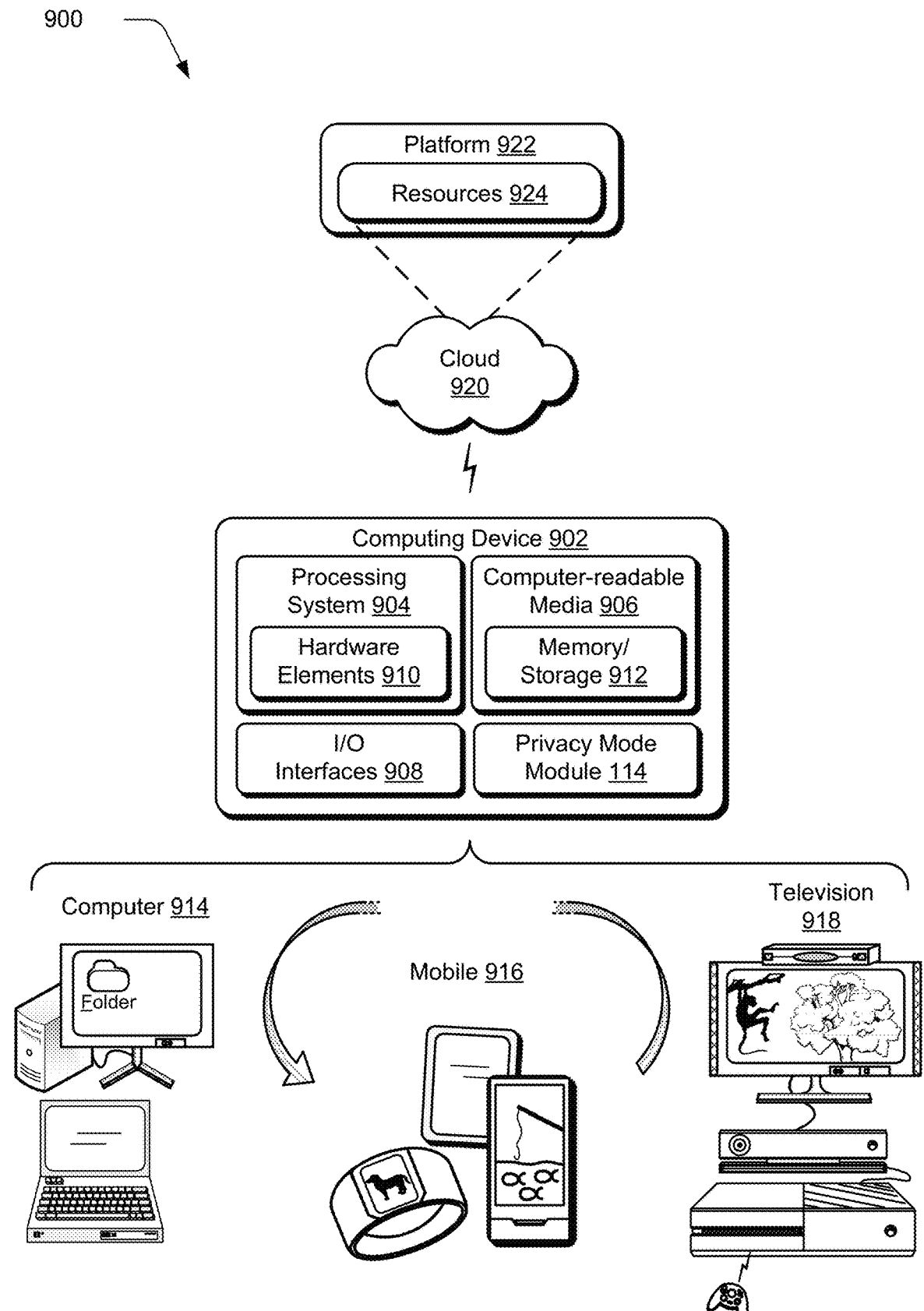
FIG. 9 illustrates an example system including various components of an example device that can be implemented as any type of computing device as described with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, wearables (e.g., wrist bands, pendants, rings, etc.) portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on. Other devices are also contemplated, such as appliances, thermostats and so on as part of the "Internet of Things."

The techniques described herein may be supported by these various configurations of the computing device 902 and are not limited to the specific examples of the techniques described herein. This functionality may also be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

CONCLUSION AND EXAMPLE IMPLEMENTATIONS

Example implementations described herein include, but are not limited to, one or any combinations of one or more of the following examples:

Operating system privacy mode techniques are described. In one or more implementations, techniques are described to control usage tracking of a computing device. An input is received by an operating system of the computing device to switch to a privacy mode. Responsive to the input, usage tracking is ceased by the operating system of user interaction with the computing device.

An example as described alone or in combination with any of the above or below examples, wherein the ceasing of the usage tracking results in data otherwise obtained via the usage tracking to be unavailable to applications executed by the computing device.

An example as described alone or in combination with any of the above or below examples, further comprising responsive to the input, communicating via an application programming interface by the operating system with an application to cause the application to cease usage tracking.

An example as described alone or in combination with any of the above or below examples, further comprising response to the input, causing output of an indication in a user interface by the operating system indicative that the operating system is in the privacy mode.

An example as described alone or in combination with any of the above or below examples, further comprising determining that at least one application executed by the computing device lacks support the privacy mode and causing output of an indication of the lack of support for the privacy mode by the at least one application.

An example as described alone or in combination with any of the above or below examples, further comprising blocking execution of at least one application by the operating system responsive to a determination that the at least one application lacks support for the privacy mode.

An example as described alone or in combination with any of the above or below examples, wherein the ceasing of the usage tracking also causes the operating system to cease geographic location tracking of the computing device to cease while in the privacy mode.

An example as described alone or in combination with any of the above or below examples, wherein the ceasing of the usage tracking causes the operating system to cause synchronization of data of the computing device with a service provider via a network to cease while in the privacy mode.

An example as described alone or in combination with any of the above or below examples, wherein the ceasing of the usage tracking causes the operating system to cause collection of a search history or task continuity of one or more applications to cease while in the privacy mode.

An example as described alone or in combination with any of the above or below examples, wherein the ceasing of the usage tracking causes the operating system to cause collection of data describing lists of frequently or recently accessed data to cease while in the privacy mode.

An example as described alone or in combination with any of the above or below examples, wherein the ceasing of the usage tracking causes the operating system to cause behavior learning of a user performed by a personal digital assistant to cease while in the privacy mode.

In one or more examples, a computing device includes a processing system and memory configured to maintain instructions that are executable by the processing system to implement an operating system having a control that is user selectable to cause the operating system to enter a privacy mode to cause applications that are executed by the processing system to cease usage tracking.

An example as described alone or in combination with any of the above or below examples, wherein the operating system is configured, while in the privacy mode, to cease usage tracking performed by the operating system.

An example as described alone or in combination with any of the above or below examples, wherein the operating system is configured, while in the privacy mode, to determine that at least one application executed by the computing device lacks support the privacy mode and cause output of an indication of the lack of support for the privacy mode by the at least one application.

An example as described alone or in combination with any of the above or below examples, wherein the operating system is configured, while in the privacy mode, to block execution of at least one application by the operating system responsive to a determination that the at least one application lacks support for the privacy mode.

An example as described alone or in combination with any of the above or below examples, wherein usage tracking includes geographic location tracking of the computing device, synchronization of data of the computing device with a service provider via a network, search history, task continuity lists of frequently or recently accessed data, and behavior learning of a user performed by a personal digital assistant.

In one or more examples, a computing device includes a processing system; and memory configured to maintain instructions that are executable by the processing system to implement an operating system having a control that is user selectable to cause the operating system to enter a privacy mode to cease usage tracking performed by the operating system.

An example as described alone or in combination with any of the above or below examples, wherein the operating system is configured, while in the privacy mode, to cease usage tracking performed by one or more applications executed by the processing system.

An example as described alone or in combination with any of the above or below examples, wherein the operating system is configured, while in the privacy mode, to determine that at least one application executed by the computing device lacks support the privacy mode and cause output of an indication of the lack of support for the privacy mode by the at least one application.

An example as described alone or in combination with any of the above or below examples, wherein the operating system is configured, while in the privacy mode, to block execution of at least one application by the operating system responsive to a determination that the at least one application lacks support for the privacy mode.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method of controlling usage tracking of a computing device, the method comprising:
   receiving an input by an operating system of the computing device to switch to a privacy mode;
   responsive to the input, entering the privacy mode by the operating system;
   for one or more of multiple applications that support the privacy mode, ceasing usage tracking of user interaction with the computing device, wherein the usage tracking comprises geographic location tracking of the computing device; and
   for one or more of multiple applications that do not support the privacy mode, blocking execution of the one or more of the multiple applications by the operating system responsive to a determination that the one or more of the multiple applications lacks support for the privacy mode.

2. A method as described in claim 1, wherein the ceasing of the usage tracking results in data otherwise obtained via the usage tracking to be unavailable to applications executed by the computing device.

3. A method as described in claim 1, further comprising responsive to the input, communicating via an application programming interface by the operating system with an application of the multiple applications that support the privacy mode to cause the application to cease usage tracking.

4. A method as described in claim 1, further comprising responsive to the input, causing output of an indication in a user interface by the operating system indicative that the operating system is in the privacy mode.

5. A method as described in claim 1 further comprising causing an output indicating lack of support for the privacy mode by the one or more of the multiple applications responsive to the determination that the one or more of multiple applications lacks support for the privacy mode.

6. A method as described in claim 1 wherein blocking execution of the one or more of the multiple applications that do not support the privacy mode comprises terminating execution of the one or more of the multiple applications by the operating system responsive to the determination that the one or more of the multiple applications lacks support for the privacy mode.

7. A method as described in claim 1 wherein blocking execution of the one or more of the multiple applications that do not support the privacy mode comprises preventing launching of the one or more of the multiple applications by the operating system responsive to the determination that the one or more of the multiple applications lacks support for the privacy mode.

8. A method as described in claim 1 wherein the ceasing of the usage tracking comprises ceasing synchronization of data of the computing device with a service provider via a network while in the privacy mode.

9. A method as described in claim 1 wherein the usage tracking further comprises search history tracking of the computing device.

10. A method as described in claim 1 wherein the usage tracking further comprises frequently or recently accessed data tracking of the computing device.

11. A method as described in claim 1 wherein the usage tracking further comprises behavior learning of a user tracking of the computing device.

12. A method as described in claim 1, further comprising verifying support of the privacy mode by the multiple applications executed by the computing device.

13. A method as described in claim 1, the input comprising user selection of a single dedicated control.

14. A computing device comprising
a processing system; and
memory configured to maintain instructions that are executable by the processing system to implement an operating system having a control that is user selectable to cause the operating system to enter a privacy mode, cease usage tracking of user interaction with the computing device for one or more of multiple applications that support the privacy mode wherein the usage tracking comprises geographic location tracking of the computing device, and block execution of the one or more of the multiple applications by the operating system responsive to a determination that one or more of the multiple applications lacks support for the privacy mode.

15. A computing device as described in claim 14, wherein the operating system is further configured, while in the privacy mode, to cause an output indicating lack of support for the privacy mode by the one or more of the multiple applications responsive to the determination that the one or more of the multiple applications lacks support for the privacy mode.

16. A computing device as described in claim 14, wherein to block execution of the one or more of the multiple applications that do not support the privacy mode, the operating system is configured, while in the privacy mode, to terminate execution of the one or more of the multiple applications by the operating system responsive to the determination that the one or more of the multiple applications lacks support for the privacy mode.

17. A computing device as described in claim 14, wherein the usage tracking further includes at least one of synchronization of data of the computing device with a service provider via a network, search history, task continuity lists of frequently or recently accessed data, and behavior learning of a user performed by a personal digital assistant.

18. A computing device comprising:
a processing system; and
memory configured to maintain instructions that are executable by the processing system to implement an operating system having a control that is user selectable to cause the operating system to enter a privacy mode, verify support of the privacy mode by multiple applications executed by the computing device, cease usage tracking of user interaction with the computing device for one or more of multiple applications that support the privacy mode wherein the usage tracking comprises geographic location tracking of the computing device, and block execution of the one or more of the multiple applications by the operating system responsive to a determination that one or more of the multiple applications lacks support for the privacy mode.

19. A computing device as described in claim 18, wherein the operating system is further configured, while in the privacy mode, to cause an output indicating lack of support for the privacy mode by the one or more of the multiple applications responsive to the determination that the one or more of the multiple applications lacks support for the privacy mode.

20. A computing device as described in claim 18, wherein to block execution of the one or more of the multiple applications that do not support the privacy mode, the operating system is configured, while in the privacy mode, to terminate execution of the one or more applications by the operating system responsive to the determination that the one or more applications lacks support for the privacy mode.

* * * * *